United States Patent [19]

Gerdts

[11] Patent Number: 4,832,714
[45] Date of Patent: May 23, 1989

[54] DEVICE FOR THE DECOMPOSITION OF A MULTICOMPONENT GAS AND TO A METHOD OF OPERATING THE SYSTEM FOR THE DECOMPOSITION OF GASES

[75] Inventor: Uwe Gerdts, Ratzeburg, Fed. Rep. of Germany

[73] Assignee: Draegerwerk Aktiengesellschaft, Fed. Rep. of Germany

[21] Appl. No.: 191,268

[22] Filed: May 6, 1988

[30] Foreign Application Priority Data

May 9, 1987 [DE] Fed. Rep. of Germany ....... 3715555

[51] Int. Cl.[4] .................. B01D 53/04; B01D 53/22
[52] U.S. Cl. ..................................... 55/158; 55/58; 55/389
[58] Field of Search ................ 55/16, 58, 75, 158, 55/316, 180, 389

[56] References Cited

U.S. PATENT DOCUMENTS

| 4,398,926 | 8/1983 | Doshi | 55/16 |
| 4,654,063 | 3/1987 | Auvil et al. | 55/158 X |
| 4,765,804 | 8/1988 | Lloyd-Williams et al. | 55/16 |

Primary Examiner—Charles Hart
Attorney, Agent, or Firm—McGlew & Tuttle

[57] ABSTRACT

A device for decomposition of a multicomponent gas, especially air, and its enrichment in at least one component, whereby a supply gas line connects a gas source to a first device having a separation forechamber, and a second separation chamber. A branch line is connected to the forechamber from which a secondary product gas can be removed. Each of the separation chambers can be operated in the favorable pressure range for an effective separation, especially when operating at low supply gas pressures. The configurations of the separation chambers are oriented to the required demand for the individual components. Also, the efficiency of a permeation device having a permeation chamber and a retentate chamber is improved. For this purpose, the separation forechamber and the permeation chamber are operated in parallel and both are supplied with feed gas, whereby the permeate chamber of the permeation device can be flushed with the waste gas from the separation forechamber across the branch line.

11 Claims, 1 Drawing Sheet

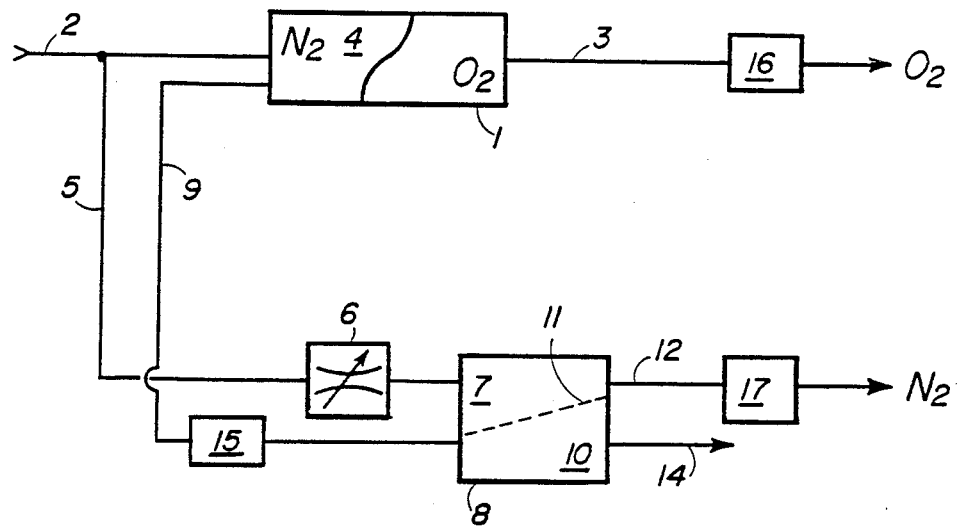

DEVICE FOR THE DECOMPOSITION OF A MULTICOMPONENT GAS AND TO A METHOD OF OPERATING THE SYSTEM FOR THE DECOMPOSITION OF GASES

FIELD AND BACKGROUND OF THE INVENTION

This invention relates in general to gas decomposition and to a new and useful method and apparatus for the decomposition of a multicomponent gas such as air.

The invention concerns a device for the decomposition of a multicomponent gas, especially air, and the concentration of at least one component thereof. A gas supply line connects a gas source with a separation forechamber, from which a product gas enriched in at least one component of the gas can be removed. The gas is removed across a product gas line. From the product gas line the waste gas, which is depleted in the particular component, can be sent across a branch line to a subsequent secondary separation chamber, from which a secondary product gas can be removed across a secondary product gas line.

A similar device is known from EP-A No. 91 969. The known device is used to produce a highly pure gas, hydrogen in the familiar application, which is to be cleaned of its unwanted impurities. For this, the feed gas is supplied to a separation forechamber, configured as a permeation chamber, which is equipped with a hydrogen-permeable membrane. The supplied impure gas enters the retentate chamber. From here, primarily the hydrogen component crosses the membrane to the permeate chamber, so that the gas is cleared of most of the impurities and hydrogen is present in the concentrated state. The impurities left behind in the retentate chamber are sent on or later use across a product gas line. The thus precleaned hydrogen is sent from the permeate chamber across a branch line to an alternating pressure adsorption bed, being a secondary separation chamber, in which the spent gas from the permeation chamber is cleared of the remaining impurities.

A disadvantage of the familiar device is the fact that, because of the successive connection of first the permeation chamber and then the alternating pressure adsorption bed to the same feed gas line, the pressure losses of both separation chambers are added. Therefore, the pressure in the permeate chamber is to be maintained at least high enough for efficient operation of the following alternating pressure adsorption beds. If the feed gas pressure is low, such as 1.5 to 5 bar, there are no longer sufficient pressure reserves to operate the adsorption bed, the reason being a pressure reduction between the feed gas line and the branch line of the permeation chamber by a factor of around 2-5. If the familiar device is operated with such low feed gas pressures, the gas pressure would have to be raised again to a suitable level prior to entering the alternating pressure adsorption beds. This could be done e.g. with a compressor, but the overall layout would become more expensive, costly, and heavy.

The efficiency of the permeation chamber, moreover, depends not only on the pressure ratio between the retentate chamber and the permeate chamber on either side of the permeable membrane, but even more on the partial pressure ratio of the component being concentrated on either side of the membrane. In the case of the known device, this partial pressure ratio is not adjustable, but instead results from the pressure and concentration relationship prevailing in the permeation chamber during the operation.

SUMMARY OF THE INVENTION

The present invention provides an improved device wherein the separation chambers can be operated in the appropriate pressure range for an effective separation, especially when operating with low feed gas pressures. The configuration of the separation chambers should be oriented to the required supply of the individual components. At the same time, the efficiency of the permeation chamber is to be increased.

An advantage of the invention is that the operating pressure for both separation chambers is not affected by their mutual connection either to the feed gas line of the separation forechamber or to the feed line of the permeation chamber.

The output of the separation forechamber and that of the permeation chamber are not directly interconnected, since they are not connected in succession, but instead are both connected to a common gas source. Thus, the performance of each separation chamber can be adjusted to the required demands for the individual components.

A further advantage results from the fact that the permeate chamber of the permeation chamber can be flushed with the spent gas which is depleted in one component of the feed gas. In this way, the partial pressure ratio on either side of the permeable membrane in the permeation chamber can be shifted in favor of one component of the gas being decomposed and the efficiency of the permeation chamber can be increased.

For many types of gas, use of an adsorption bed provides an especially high purity of product gas.

The device proves especially advantageous when the feed gas for separation of air into its components of oxygen and nitrogen is conveyed to an adsorption bed for concentration of oxygen and to a permeation chamber for concentration of nitrogen at the same time. For this, it is advisable to fill the adsorption bed with a zeolite and to provide the permeation chamber with an oxygen permeable membrane. The adsorption bed produces oxygen-enriched air as the product gas and the retentate chamber produces nitrogen-enriched air. If the alternating pressure adsorption bed is provided in a layout with only one adsorption bed, the desorbing nitrogen during the regeneration phase is sent as waste gas across the branch line to the permeate chamber, so that under continual supply of feed gas to the retentate chamber of the permeation chamber the oxygen partial pressure is lowered by the increased quantity of nitrogen in the permeate chamber, thus favoring permeation of oxygen through the oxygen-permeable membrane. If the alternating pressure adsorption bed is configured with two alternately switched adsorption beds, one being regenerated with the product gas of the other, then the flushing of the permeate chamber of the permeation chamber can occur continuously. The result is a device for decomposition of air which constantly delivers oxygen and nitrogen enriched product gases. The waste gas accruing during the regeneration of the alternating pressure adsorption bed is usefully recycled, and not just vented to the environment.

To assure a continuous flushing of the permeate chamber, especially when using a single stage adsorption bed, a buffer reservoir can be provided in the branch line, in which a suitable quantity of waste gas can be collected in order to enable a continuous operation.

For better individual adjustment of the feed gas pressures, an adjustable throttle can be installed in the feed gas line and/or the feed line of the permeation chamber. With this auxiliary, it is possible to adjust the favorable pressure relationship at either side of the permeable membrane for good efficiency, especially as regards the permeation chamber.

Accordingly it is an object of the invention to provide an improved method for the decomposition of a multicomponent gas such as air and its enrichment in at least one component using a first device which has a separation forechamber and a permeation device which has a permeation chamber and a retentate chamber comprising conducting a supply of the gas to the separation forechamber while removing a waste gas from the forechamber and delivering it to permeation chamber while supplying the retentate chamber with the supply of the gas to be separated so that the separation fore chamber and the permeation chamber are operating in a favorable pressure range for effective separation especially when operating at low supply gas pressures, the separation forechamber and the permeation chamber being operated in parallel and both being supplied with a feed gas so that the permeate chamber can be flushed with the waste gas from the separation forechamber.

A further object of the invention is to provide a device for decomposing a multicomponent gas which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The only FIGURE is a schematic representation of a device for decomposing a multicomponent gas which is constructed in accordance with the invention.

GENERAL DESCRIPTION OF THE PREFERRED EMBODIMENT

Referring to the drawing in particular the invention embodied therein includes a first separation forechamber 7 and a second permeation chamber 8.

An example of the invention is presented in the diagram and will be explained below. The single diagram shows schematically a single stage alternating pressure adsorption bed 1, which is connected by a supply gas line 2 to an air supply (not shown). A product gas line 3 supplies oxygen-enriched air to a consumer, (also not shown). A zeolite packing 4 in the bed 1, necessary for the oxygen concentration, is partially covered with nitrogen N2 and delivers concentrated oxygen at the end facing the product gas line 3. From the supply line 2, a feed line 5 is conducted across an adjustable throttle 6 to the retentate chamber 7 of a permeation chamber 8. The adsorption bed 1 is connected to a permeate chamber 10 across a branch line 9 with a buffer reservoir 15. The permeation chamber 8, configured as a second separation chamber, has an oxygen-permeable membrane 11, so that a nitrogen-enriched second product gas can be removed from a second product gas line 12 at the retentate chamber 7. A vent line 14 connects the permeate chamber 70 to the surroundings.

The presented example assumes an operation of the device during the adsorption phase of the adsorption bed 1 so that nitrogen is adsorbed in the zeolite packing 4 and oxygen-enriched product gas is conveyed from the product gas line across a buffer reservoir 16 to a consumer (not shown). At the same time, the supply gas is supplied across the feed line 5 of the retentate chamber 7, from which the oxygen component crosses the permeable membrane 11 to the permeate chamber 10 and is released to the surroundings across the vent line 14. From the second product gas line 12, nitrogen-enriched air is supplied across a buffer reservoir 17 to another consumer (also not shown). During the regeneration phase of the adsorption bed 1, nitrogen is desorbed from the zeolite packing 4 and taken across the branch line 9 to the permeate chamber 10, so that the difference of the oxygen partial pressure across the membrane 11 is increased and a permeation of oxygen is favored.

While a specific embodiment of the invention has been shown and described in detail to illustrate the application of the principles of the invention, it will be understood that the invention may be embodied otherwise without departing from such principles.

What is claimed is:

1. A device for decomposing a multicomponent gas, comprising a first device having a separation forechamber a branch gas line having one end connected to said forechamber, a product gas line for the removal of a gas connected to said separation fore chamber, a secondary separation device including a permeable membrane separating a retentate chamber and a permeate chamber, said branch line having another end connected to said permeate chamber for the removal of a waste gas depleted in least one gas component from said separation forechamber and delivering it to said permeate chamber, and a feed line connected from said gas supply line to said retentate chamber.

2. A device according to claim 1, wherein said separation forechamber comprises an alternating pressure adsorption bed.

3. A device according to claim 2, wherein said first device comprises an alternating pressure adsorption bed which the air with oxygen and wherein said permeation chamber has means to enrich the air nitrogen.

4. A device according to claim 3, wherein said adsorption bed is filled with a zeolite and said permeation chamber is provided with an oxygen permeable membrane.

5. A device according to claim 1, wherein said branch line has a buffer reservoir.

6. A device according to claim 1, wherein said feed line has an adjustable throttle therein.

7. A gas separation device comprising at least one separation forechamber, at least one first inlet line attached to said separation forechamber for supplying said at least one separation forechamber with a multicomponent gas, a gas product line connected to said at least one separation forechamber for carrying off at least one first component product gas, means in said separation forechamber for removing at least one gas component, at least one permeation chamber portion having a retent chamber portion and a permeate chamber portion, a permeable membrane between said retent chamber portion and said permeate chamber portion, at least one multicomponent feed line attached to said retent chamber for supplying said at least one retent chamber with said multicomponent gas, a secondary product line connected to said retent chamber for removing a second component product gas, at least one branch line having a first end connected to said at least one separation forechamber for removing gases remaining in said separation forechamber and a second end connected to said permeate chamber for delivering said remaining gases to said permeate chamber and providing a partial pressure difference across said permeable membrane favoring permeation of said first substantially single component gas through said membrane.

8. A gas separation device according to claim 7, wherein air comprises said multicomponent gas including zeolite in said separation forechamber for separating nitrogen from air and wherein said membrane comprises a membrane permeable to oxygen.

9. A gas separation device according to claim 7, wherein said separation forechamber is an absorption chamber.

10. A gas separation device according to claim 7, wherein said separation forechamber has an absorption means for absorbing nitrogen.

11. A gas separation device according to claim 7, including a buffer supply reservoir for gases connected to said permeate chamber for supplying a continuous second gas component to said permeate chamber.

* * * * *